United States Patent [19]
Itoh et al.

[11] Patent Number: 5,390,163
[45] Date of Patent: Feb. 14, 1995

[54] DATA EXCHANGE CAPABLE OF MINIMIZING LOSS OF A DATA BLOCK

[75] Inventors: Chikashi Itoh, Tokyo; Toshio Suzuki, Fukuoka, both of Japan

[73] Assignee: NEC Corporation, Tokyo, Japan

[21] Appl. No.: 117,618

[22] Filed: Sep. 8, 1993

[30] Foreign Application Priority Data

Sep. 9, 1992 [JP] Japan .................................. 4-241013

[51] Int. Cl.⁶ .......................... H04J 3/14; H04L 12/56
[52] U.S. Cl. ........................................ 370/13; 370/16; 370/60
[58] Field of Search ...................... 370/13, 14, 16, 58.1, 370/60, 60.1, 61, 94.1, 94.2; 340/825.01, 825.03, 827, 825.06, 825.07, 826; 371/8.1, 8.2, 11.1, 11.2; 379/279

[56] References Cited

U.S. PATENT DOCUMENTS

| | | | |
|---|---|---|---|
| 5,072,440 | 12/1991 | Isono et al. | 370/16 |
| 5,153,578 | 10/1992 | Izawa et al. | 370/16 |
| 5,274,633 | 12/1993 | Kato et al. | 370/16 |
| 5,280,469 | 1/1994 | Taniguchi et al. | 370/13 |
| 5,283,782 | 2/1994 | Takase et al. | 370/16 |

*Primary Examiner*—Alpus Hsu
*Attorney, Agent, or Firm*—Sughrue, Mion, Zinn, Macpeak & Seas

[57] ABSTRACT

In a data exchange for use in an asynchronous transfer mode communication system, the data exchange has first and second buffers. An input data block is selectively loaded with the first and the second buffers to be read as first and second output data blocks out of the first and the second buffers. When the first buffer is changed from an active buffer to a stand-by buffer, the input data block is successively loaded with the first and the second buffers to be memorized as first and second buffered data blocks up to a predetermined block number. A test data block is loaded as the input data block with the first and the second buffers. When the second output data block is coincident with the test data block, the second buffer is controlled so that the second output data block is not read out of the second buffer until the first data block is coincident with the test data block. After each of the first and the second output data blocks is coincident with the test data block, the input data block is loaded with only second buffer. Furthermore, the input data block is loaded with only second buffer when the number of the second buffered data block is equal to the predetermined block number even if the first output data block is not coincident with the test data block.

3 Claims, 4 Drawing Sheets

DATA EXCHANGE CAPABLE OF MINIMIZING LOSS OF A DATA BLOCK

BACKGROUND OF THE INVENTION

This invention relates to a data exchange for exchanging an input data block into an output data block to carry out transmission of the output data block.

It is to be noted throughout the instant specification that a data exchange is for use in an asynchronous transfer mode (ATM) communication system and may therefore be called a cell data exchange for exchanging an input data block into an output data block although this invention may not be restricted to the cell data exchange. The cell data exchange comprises first and second exchanging sections each of which exchanges an input cell data block into an output cell data block. One of the first and the second exchanging sections serves as an active exchanging section. Another one of the first and the second exchanging sections serves as a stand-by exchanging section. It is well known in the art that the first and the second exchanging sections have first and second buffers, respectively. When the first exchanging section is operated as the active exchanging section, the first buffer memorizes a plurality of input cell data blocks as memorized cell data blocks. Each of the memorized cell data blocks is read as the output cell data block out of the first buffer. On the other hand, the second buffer is empty during operation of the first buffer.

A conventional cell data exchange further comprises a receiving section and a transmitting section. The receiving section is operable to receive a received cell data block and to supply the received cell data block as the input cell data block to the active exchanging section, for example, the first exchanging section. The transmitting section is for carrying out transmission of the output cell data block.

It is assumed that the first exchanging section serves as the active exchanging section and the second exchanging section serves as the stand-by exchanging section, as mentioned above. Under the circumstances, let the first exchanging section be often changed to the stand-by exchanging section according to a result of a situation of the first exchanging section under control of a control unit in the following manner. In this event, the receiving section at first instructs to the preceding stage equipment not to send any more cell data block by sending the control signal. At the same time, the first exchanging section stops producing the output cell data block. As a result, some memorized cell data blocks are held as residual cell data blocks in the first buffer. Then, the residual cell data blocks are transferred to the second buffer through a transfer path to form the second buffer having the same contents as the first buffer. After completion of transferring the residual cell data blocks from the first buffer to the second buffer, the first exchanging section is changed over to the stand-by exchanging section and the second exchanging section is concurrently changed over to the active exchanging section. Finally, the control signal is sent to the preceding stage equipment to restore the previous instruction and to instruct that the change over operation has been completed and the receiving input cell data block is now ready.

However, the change over operation described above in the conventional cell data exchange has the following several disadvantages. The first is that the change over operation causes delays in transmission of cell data blocks due to transferring the residual cell data blocks held in the first buffer to the second buffer, and this is not suitable for the application of the communication requiring strict real time operation. The second is that the change over operation requires relatively complicated control procedures. The third is that traffic congestion occurs in the preceding stage equipment due to the control signal which has been instructed to stop sending cell data blocks temporarily during the change over operation. This may cause loss of some input cell data blocks. The fourth is that a large capacity and high speed transfer path is required in a large system to transfer the residual cell data blocks from the first exchanging section to the second exchanging section.

SUMMARY OF THE INVENTION

It is an object of this invention to provide a data exchange which is capable of quickly changing an active section to a stand-by section.

It is another object of this invention to provide a data exchange which is capable of minimizing loss of input cell data blocks.

Other object of this invention will become clear as the description proceeds.

According to this invention, there is provided a data exchange for use in an asynchronous transfer mode communication system for exchanging an input data block into an output data block. The data exchange comprises first buffer means for successively memorizing the input data block as a first buffered data block to a predetermined block number to produce the first buffered data block as a first output data block, second buffer means for successively memorizing the input data block as a second buffered data block to the predetermined block number to produce the second buffered data block as a second output data block, receiving means for receiving a received data block to selectively supply the received data block as the input data block to the first and the second buffer means, and transmitting means for carrying out transmission of one of the first and the second data blocks as the output data block. The data exchange further comprises control signal producing means for producing first and second control signals. The receiving means is responsive to the first control signal to supply the input data block to the first buffer means. The receiving means is also responsive to the second control signal to supply the input data block to the first and the second buffer means. Test data supplying means supplies a test data block as the input data block to the first and the second buffer means in response to the second control signal. Detecting means detects whether or not the first output data block is coincident with the test data block to produce a first detecting signal. The detecting means further detects whether or not the second output data block is coincident with the test data block to produce a second detecting signal. Monitoring means monitors the second buffer means to produce a monitoring signal when the number of said second buffered data blocks is equal to the predetermined block number. Control means is responsive to the first and the second detecting signals for controlling the receiving means and the transmitting means to connect the receiving means and the transmitting means to the second buffer means. The control means is also responsive to the monitoring signal for controlling the receiving means and the transmitting means to connect the receiving means and the transmitting means to the second buffer means.

DESCRIPTION OF THE PREFERRED EMBODIMENT

Figure 1:
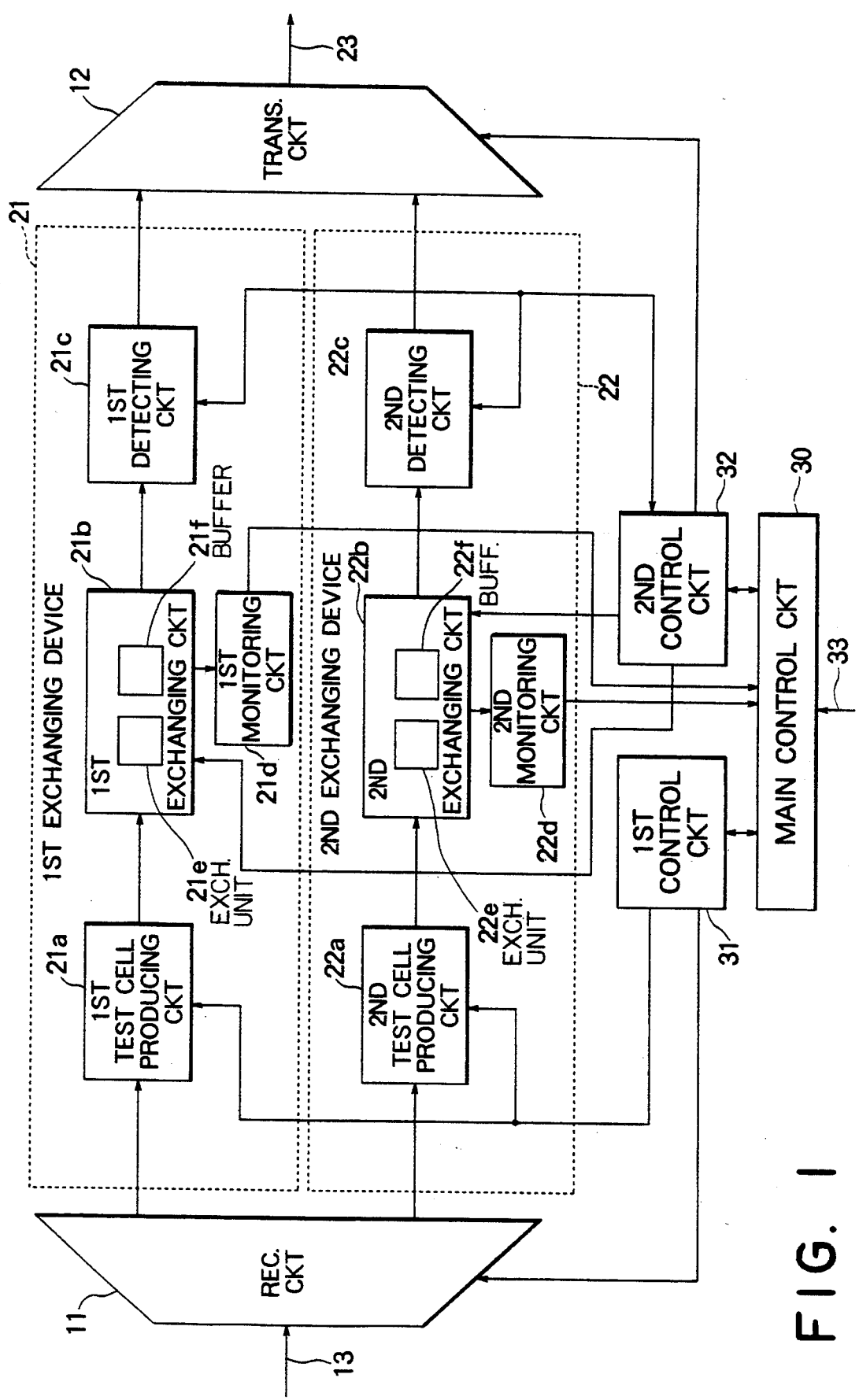
FIG. 1 is a block diagram of a data exchange according to a preferred embodiment of this invention.

Referring to FIG. 1, the illustrated data exchange is for use in an asynchronous transfer mode (ATM) communication system and is operable to exchange an input data block into an output data block. In this connection, each of the input and the output data blocks may be called a cell data block. Each of the input and the output cell data blocks has a data block of a fixed length. The data cell block has a header for arranging an address signal and a data area for arranging a data signal. The data exchange exchanges the input cell data block into the output cell data block in accordance with the address signal as known in the art.

The data exchange comprises a receiving circuit 11 and a transmitting circuit 12. The receiving circuit 11 is connected to an external receiving path 13 to successively receive a plurality of received cell data blocks. The receiving circuit 11 is further connected to first and second exchanging devices 21 and 22 to selectively supply the received cell data blocks as input cell data blocks to the first and the second exchanging devices 21 and 22. The first exchanging device 21 exchanges each of the input cell data blocks into a first output cell data block to deliver the first cell data block to the transmitting circuit 12 as will be described hereinafter. Similarly, the second exchanging device 22 exchanges each of the input cell data block into a second output cell data block to deliver the second cell data block to the transmitting circuit 12. The transmitting circuit 12 selectively transmits one of the first and the second cell data blocks as the output cell data block on an external transmission path 23 in a manner to be described later. The data exchange further comprises a main control circuit 30 and first and second control circuits 31 and 32.

The first exchanging device 21 comprises a first test cell producing circuit 21a, a first cell exchanging circuit 21b, a first detecting circuit 21c, and a first monitoring circuit 21d. The first cell exchanging circuit 21b comprises a first exchanging unit 21e and a first buffer 21f. The first exchanging unit 21e exchanges each of the input cell data blocks into a first exchanged cell data block in a time division fashion to store the first exchanged cell data in the first buffer 21f as a first memorized cell data. Each of the first memorized cell data blocks is read out of the first buffer 21f as the first output cell data block at a predetermined time interval.

The first buffer 21f has a predetermined capacity, namely, the first buffer 21f can memorize the first memorized cell data blocks up to a predetermined number. The first buffer 21f may be, for example, a first-in-first-out memory. The first monitoring circuit 21d monitors the number of the first memorized cell data blocks which are memorized in the first buffer 21f. When the number of the first memorized cell data blocks is equal to the predetermined number, the first monitoring circuit 21d produces a first monitoring signal.

Similarly, the second exchanging device 22 comprises a second test cell producing circuit 22a, a second cell exchanging circuit 22b, a second detecting circuit 22c, and a second monitoring circuit 22d. The second cell exchanging circuit 22b comprises a second exchanging unit 22e and a second buffer 22f. Like the first exchanging unit 21e, the second exchanging unit 22e exchanges each of the input cell data blocks into a second exchanged cell data block in a time division fashion to store the second exchanged cell data in the second buffer 22f as a second memorized cell data. Each of the second memorized cell data blocks is read out of the second buffer 22f as the second output cell data block at the predetermined time interval.

The second buffer 22f has the predetermined capacity, namely, the second buffer 22f can memorize the second memorized cell data blocks up to the predetermined number. The second buffer 22f may be also a first-in-first-out memory. The second monitoring circuit 22d monitors the number of the second memorized cell data blocks which are memorized in the second buffer 22f. When the number of the second memorized cell data blocks is equal to the predetermined number, the second monitoring circuit 22d produces a second monitoring signal.

On an exchange operation, one of the first and the second exchanging devices 21 and 22 is used as an active exchanging device while another one of the first and the second exchanging devices 21 and 22 is used as a stand-by exchanging device. In the illustrated example, it is assumed that the first exchanging device 21 is used as the active exchanging device while the second exchanging device 22 is used as the stand-by exchanging device.

More specifically, the main control circuit 30 supplies an operation mode signal to the first and the second control circuits 31 and 32 in response to an active signal which is given through a control path 33 from an external device (not shown). Thus, the operation mode signal determines either an active state or a stand-by state of the first and the second exchanging devices 21 and 22. The active signal lends itself to set the first exchanging device 21 into the active exchanging device, as will be clear as the description proceeds.

Responsive to the operation mode signal, the first and the second control circuits 31 and 32 supply first reception and transmission control signals to the receiving and the transmitting circuits 11 and 12, respectively. Supplied from the first control circuit 31 with the first reception control signal, the receiving circuit 11 selects the first exchanging device 21 to successively supply the first exchanging device 21 with the received cell data blocks as the input cell data blocks. Responsive to the first transmission control signal, the transmitting circuit 12 selects the first exchanging device 21 to receive the first output cell data blocks.

The first reception and the transmission control signals are also delivered to the first and the second test cell producing circuits 21a and 22a and the detecting circuits 21c and 22c, as illustrated in FIG. 1. Supplied with the first reception control signal, the first and the second test cell producing circuits 21a and 22a allow cell data blocks supplied thereto to pass therethrough, respectively. Similarly, the first and the second detecting circuits 21c and 22c allow cell data blocks supplied thereto to pass therethrough in response to the first transmission control signal, respectively. In the illustrated example, the first cell exchanging circuit 21b is intermediate between the first test cell producing circuit 21a and the first detecting circuit 21c to receive the input cell data blocks from the receiving circuit 11 through the test cell producing circuit 21a and to exchange the input cell data blocks into the first output cell data blocks. The first output cell data blocks are delivered through the first detecting circuit 21c to the transmitting circuit 12 to be transmitted as the output cell data blocks on the external transmission path 23.

Reviewing FIG. 1, description will be made as regards a change over operation of the first exchanging device 21 to the stand-by exchanging device.

On the change over operation, the main control circuit 30 is given a ready command signal through the control path 33. Supplied with the ready command signal, the main control circuit 30 controls the first and the second control circuits 31 and 32 so that the first and the second control circuits 31 and 32 produce second reception and transmission control signals, respectively. The second reception control signal is delivered from the first control circuit 31 to the receiving circuit 11 and the first and the second test cell producing circuits 21a and 22a while the second transmission control signal is delivered from the second control circuit 32 to the first and the second detecting circuits 21c and 22c and the transmitting circuit 12.

Responsive to the second reception control signal, the first and the second test cell producing circuits 21a and 22a produce a pair of test cells to supply the test cells to the first and the second cell exchanging circuits 21b and 22b, respectively. Each test cell has a header defined by CCITT (The International Telegraph and Telephone Consultive Committee) Recommendation I.361. Each test cell further has a test cell area for arranging a test identifier code which has a predetermined pattern. After production of the test cells, the receiving circuit 11 supplies both of the first and the second exchanging devices 21 and 22 with the received cell data blocks as the input cell data blocks in response to the second reception control signal.

Figure 2:
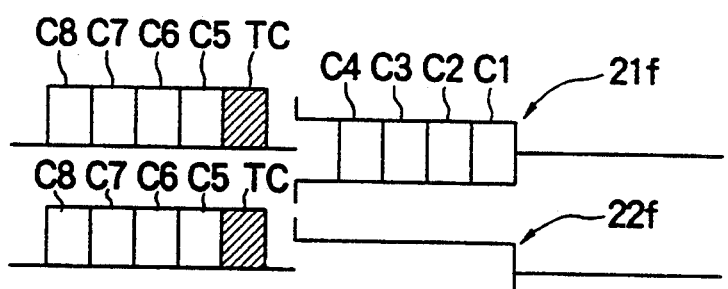
FIGS. 2(A)–2(F) are diagrams for describing an operation of the data exchange illustrated in FIG. 1.
Figure 2:
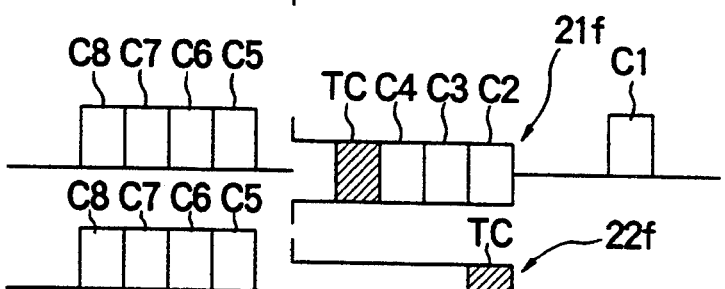
Figure 2:
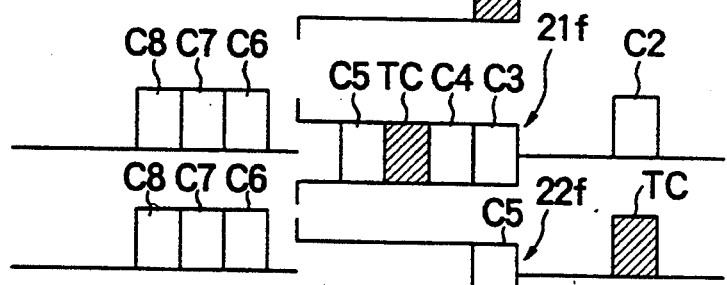
Figure 2:
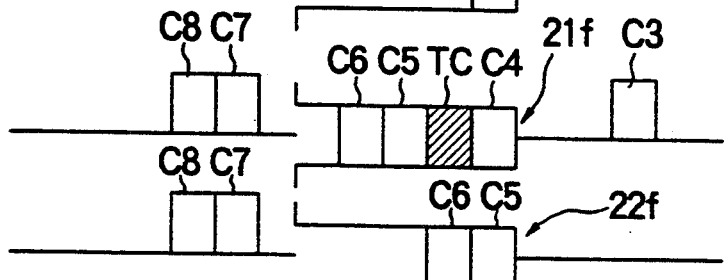
Figure 2:
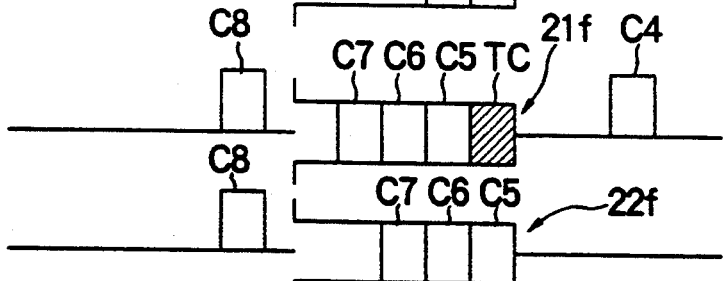
Figure 2:
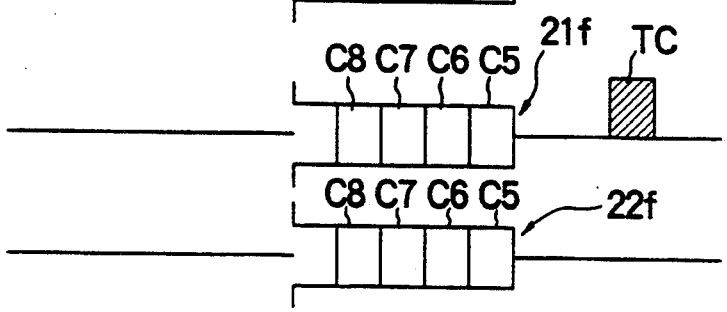

Referring to FIG. 2 in addition to FIG. 1, it is assumed that the first buffer 21f is loaded with memorized cell data blocks C1 to C4 as the first memorized cell data blocks and that the second buffer 22f is empty, as shown in FIG. 2(A). Under the circumstances, the test cell TC is followed by exchanged cell data blocks C5 to C8 which are supplied from each of the first and the second exchanging units 21e and 22e. Namely, the exchanged cell data blocks C5 to C8 are commonly supplied to the first and the second buffers 21f and 22f and both are equal to the first and the second exchanged cell data blocks which are identical with each other.

As shown in FIG. 2(B), the test cells TC are memorized in the first and the second buffers 21f and 22f as memorized test cells TC at a first time interval, respectively. In this event, the test cell TC is loaded as a memorized test cell with a last stage of the first buffer 21f while the same test cell TC is loaded with a leading stage of the second buffer 22f. The memorized cell data block C1 is read out of the first buffer 21f in a first-in-first-out fashion as the first output cell data block to be supplied to the first detecting circuit 21c at the first time interval. On the other hand, no cell data block is read out of the second buffer 22f at the first time interval.

As described above, the first detecting circuit 21c is given the second transmission control signal during the change over operation. Supplied with the second transmission control signal, the first detecting circuit 21c detects whether or not the first output cell data block is coincident with the test cell TC to produce a first detecting signal representative of a result of detection. More particularly, the first detecting circuit 21c produces the first detecting signal when the first output cell data block has the test cell identifier code. In this case, the first detecting circuit 21c does not produce the first detecting signal inasmuch as the first output cell data block does not have the test cell identifier code. The first detecting circuit 21c allows the first output cell data block to pass therethrough.

As shown in FIG. 2(C), the cell data blocks C5 are memorized in the last stage and the leading stage of the first and the second buffers 21f and 22f as memorized cell data blocks C5 at a second time interval, respectively. Simultaneously, the memorized cell data block C2 is read out of the first buffer 21f as the first output cell data block to be supplied to the first detecting circuit 21c at the second time interval. In this event, the memorized test cell TC is read out of the second buffer 22f as the second output cell data block to be supplied to the second detecting circuit 22c.

As described above, the second detecting circuit 22c is given the second transmission control signal during the change over operation. Supplied with the second transmission control signal, the second detecting circuit 22c detects whether or not the second output cell data block is coincident with the test cell to produce a second detecting signal on detection of coincidence between the second output cell data block and the test cell. More particularly, the second detecting circuit 22c produces the second detecting signal when the second output cell data block has the test cell identifier code. On the other hand, the first detecting circuit 21c does not produce the first detecting signal because the first output cell data block does not have the same identifier code as the test cell, as illustrated in FIG. 2(C).

The second detecting signal is delivered from the second detecting circuit 21c to the second control circuit 32. Supplied with the second detecting signal, the second control circuit 32 controls the second exchanging circuit 22b to stop a readout operation of the second buffer 22f.

As shown in FIG. 2(D), the cell data blocks C6 are loaded with the first and the second buffers 21f and 22f as memorized cell data blocks C6 at a third time interval. Instead, the memorized cell data block C3 is read out of the first buffer 21f as the first output cell data blocks to be supplied to the first detecting circuit 21c. On the other hand, no output cell data block is read out of the second buffer 22f because the readout operation is stopped as mentioned before.

As shown in FIG. 2(E), the cell data blocks C7 are loaded with the first and the second buffers 21f and 22f as memorized cell data blocks C7 at a fourth time interval. Simultaneously, the memorized cell data block C4 is read out of the first buffer 21f as the first output cell data block to be supplied to the first detecting circuit 21c at the fourth time interval.

As shown in FIG. 2(F), the cell data blocks C8 are loaded with the first and the second buffers 21e and 22f as memorized cell data blocks C8 at a fifth time interval. The memorized test cell data TC read out of the first buffer 21f as the first output cell data blocks to be supplied to the first detecting circuit 21c at the fifth time interval. As a result, each of the first and the second buffers 21f and 22f is loaded with the memorized cell data blocks C5 to C8. Namely, the second buffer 22f has the same contents as the first buffer 21f.

When the test cell data TC is supplied as the first output cell data block with the first detecting circuit 21c, the first detecting circuit 21c produces the first detecting signal as described above to supply the first detecting signal to the second control circuit 32. Responsive to the first detecting signal, the second control circuit 32 controls the first exchanging circuit 21b to stop a readout operation of the first buffer 21f.

After receiving the first and the second detecting signals, the second control circuit 32 supplies the main control circuit 30 with a change over enable signal. Supplied with the change over enable signal, the main control circuit 30 delivers a change over operation signal to the first and the second control circuits 31 and 32 so as to indicate the change over operation. Responsive to the change over operation signal, the first control circuit 31 controls the receiving circuit 11 so that the receiving circuit 11 distributes the received cell data blocks only to the second exchanging device 22. On the other hand, the second control circuit 32 controls the transmitting circuit 12 in response to the change over operation signal so that the transmitting circuit 12 selects the second output cell data block which is supplied from the second exchanging device 22. Furthermore, the second control circuit 32 makes the first and the second exchanging circuits 21b and 22b allow the readout operation. Stated otherwise, the readout operation of each of the first and the second exchanging circuits 21b and 22b is restarted under control of the second control circuit 32.

Referring to FIG. 3 in addition to FIG. 1, description will be made as regards the above-mentioned change over operation when a fault occurs in the first exchanging device 21 which is operable as the active exchanging device. It is assumed that the first buffer 21f is loaded with memorized cell data blocks C1 to C4 as the first memorized cell data blocks and that the second buffer 22f is empty, as shown in FIG. 3(A). The test cell TC is followed by exchanged cell data blocks C5 to C8 which are supplied from each of the first and the second exchanging units 21e and 22e. Under the circumstances, it is assumed that the fault occurs in the first exchanging device 21 and the first buffer 21f can not memorize cell data blocks supplied thereto. As a result, the test cell TC is memorized only in the second buffer 22f as memorized test cell TC at a first time interval, as shown in FIG. 3(B). In this event, the test cell TC is loaded as a memorized test cell with a leading stage of the second buffer 22f. The memorized cell data block C1 is read out of the first buffer 21f in a first-in-first-out fashion as the first output cell data block to be supplied to the first detecting circuit 21c at the first time interval. On the other hand, no cell data block is read out of the second buffer 22f at the first time interval.

The first detecting circuit 21c does not produce the first detecting signal inasmuch as the first output cell data block does not have the test cell identifier code. The first detecting circuit 21c allows the first output cell data block to pass therethrough.

Figure 3A:
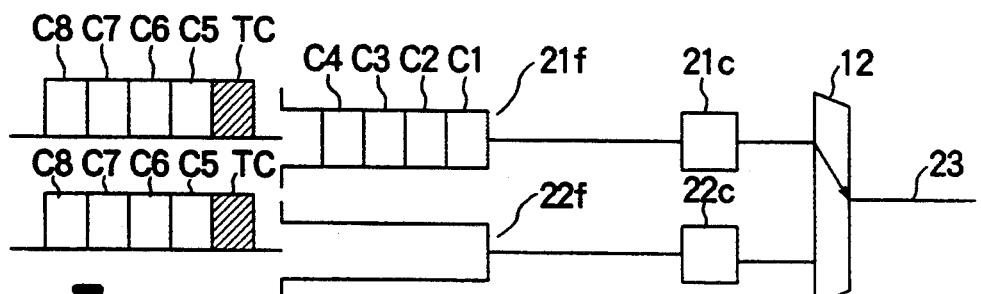
FIGS. 3(A)–3(G) are diagrams for describing another operation of the data exchange illustrated in FIG. 1.
Figure 3B:
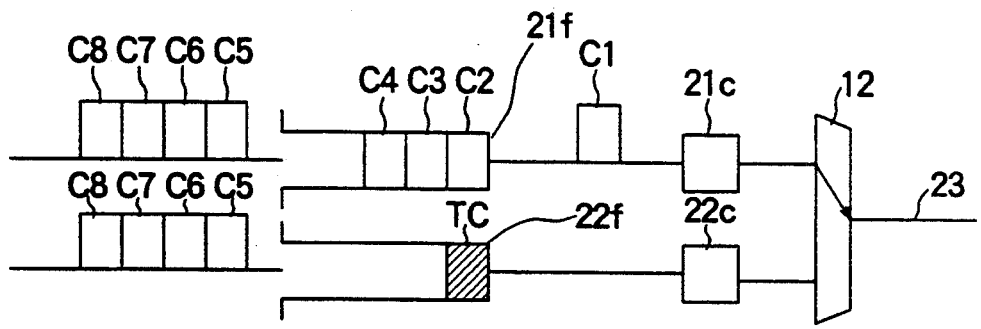
Figure 3C:
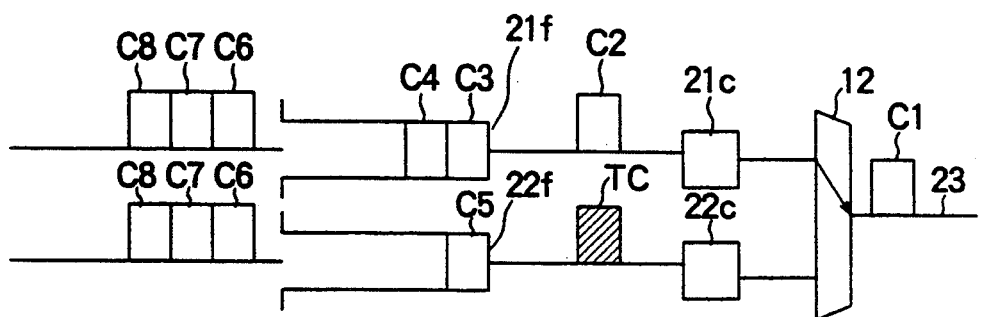

As shown in FIG. 3(C), the cell data block C5 is memorized in the leading stage of the second buffer 22f as memorized cell data block C5 at a second time interval. Simultaneously, the memorized cell data block C2 is read out of the first buffer 21f as the first output cell data block to be supplied to the first detecting circuit 21c at the second time interval. In this event, the memorized test cell TC is read out of the second buffer 22f as the second output cell data block to be supplied to the second detecting circuit 22c.

The second detecting circuit 22c produces the second detecting signal when the second output cell data block has the test cell identifier code. On the other hand, the first detecting circuit 21c does not produce the first detecting signal because the first output cell data block does not have the same identifier code as the test cell, as illustrated in FIG. 3(C).

Inasmuch as the transmitting circuit 12 is connected with the first detecting circuit 21c, the transmitting circuit 12 transmits the cell data block C1 as the output cell data block on the external transmission path 23 at the second time interval.

The second detecting signal is delivered from the second detecting circuit 22c to the second control circuit 32. Supplied with the second detecting signal, the second control circuit 32 controls the second exchanging circuit 22b to stop a readout operation of the second buffer 22f.

Figure 3D:
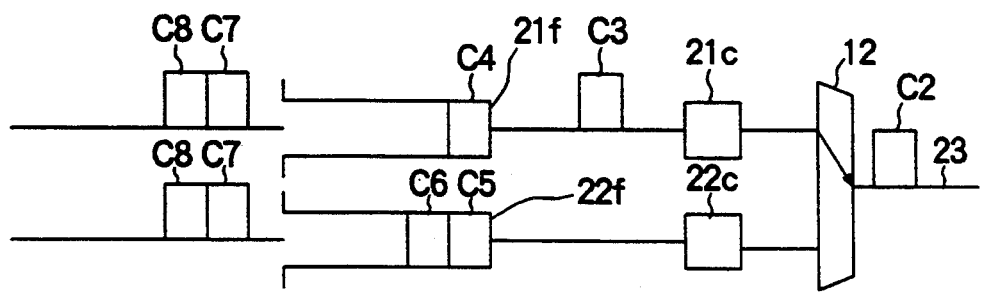

As shown in FIG. 3(D), the cell data block C6 is loaded with the second buffer 22f as memorized cell data block C6 at a third time interval. The memorized cell data block C3 is read out of the first buffer 21f as the first output cell data block to be supplied to the first detecting circuit 21c. On the other hand, no output cell data block is read out of the second buffer 22f because the readout operation is stopped as mentioned before. The transmitting circuit 12 transmits the cell data block C2 as the output cell data block on the external transmission path 23 at the third time interval.

Figure 3E:
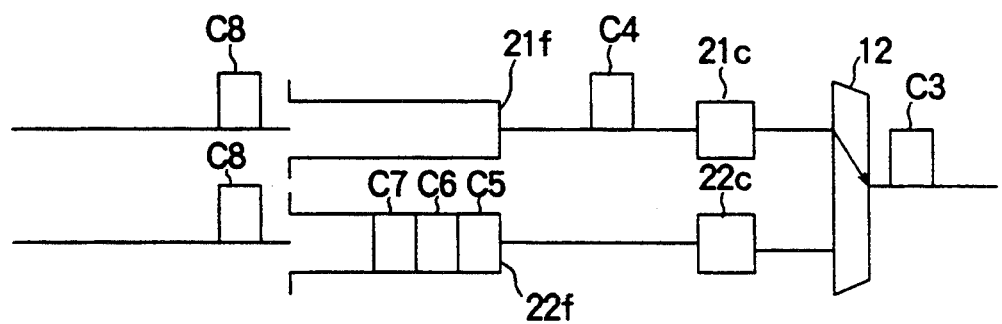

As shown in FIG. 3(E), the cell data block C7 is loaded with the second buffer 22f as memorized cell data block C7 at a fourth time interval. Simultaneously, the memorized cell data block C4 is read out of the first buffer 21f as the first output cell data block to be supplied to the first detection circuit 21c at the fourth time interval. The cell data block C3 is transmitted from the transmitting circuit 12 to the external transmission path 23 at the fourth time interval.

Figure 3F:
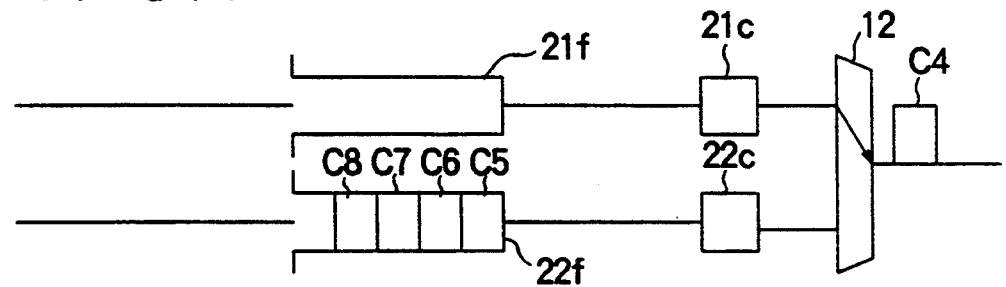

As shown in FIG. 3(F), the cell data block C8 is loaded with the second buffer 22f as memorized cell data block C8 at a fifth time interval. No output cell data block is read out of the first buffer 21f at the fifth time interval because the first buffer 21f is empty. The cell data block C4 is transmitted from the transmitting circuit 12 to the external transmission path 23 at the fifth time interval.

As described above, the second monitoring circuit 22d monitors the number of the memorized cell data blocks which are memorized in the second buffer 22f. When the number of the memorized cell data blocks is equal to the predetermined number, the second monitoring circuit 22d produces the second monitoring signal to supply the second monitoring signal to the main control circuit 30. In the example illustrated in FIG. 3, the predetermined number is equal to four.

Figure 3G:
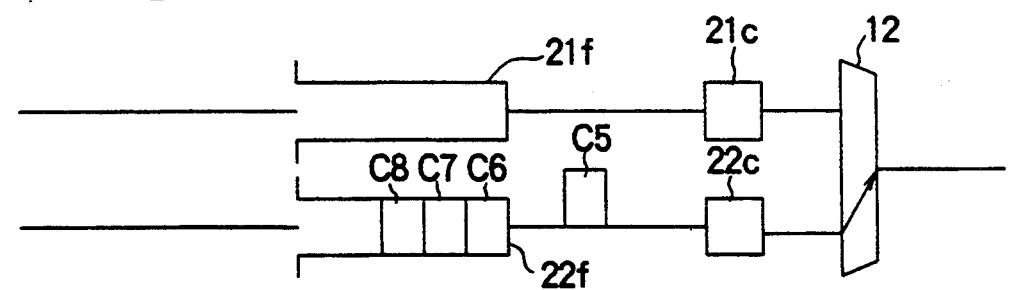

Supplied with the second monitoring signal, the main control circuit 30 delivers the change over operation signal to the first and the second control circuits 31 and 32 so as to indicate the change over operation. Responsive to the change over operation signal, the first control circuit 31 controls the receiving circuit 11 so that the receiving circuit 11 distributes the received cell data blocks only to the second exchanging device 22. On the other hand, the second control circuit 32 controls the transmitting circuit 12 in response to the change over operation signal so that the transmitting circuit 12 selects the second output cell data block which is supplied from the second exchanging device 22. Furthermore, the second control circuit 32 makes the first and the second exchanging circuits 21b and 22b allow the readout operation. As a result, the memorized cell data block C5 is read out of the second buffer 22f as the second output cell data block, as shown in FIG. 3(G).

In FIG. 1, both of the first and the second test cell producing circuits 21a and 22a may collectively be called a test cell supplying section, as mentioned above. The first and the second detecting circuits 21c and 22c may collectively be referred to as a detecting section for detecting the test cell data. In addition, the main, the first, and the second control circuits 30, 31, and 32 may collectively be called a control signal producing section or a control section for producing the above-mentioned various signals.

Description is made only about changing over the first exchanging device into the stand-by exchanging device when the first exchanging device is the active exchanging device in the above embodiment. However, similar operation can be also carried out when the second exchanging device is being operable as the active exchanging device and is thereafter changed into the stand-by exchanging device.

It is assumed that the second buffer can not memorize the cell data blocks supplied thereto when the second exchanging device is changed from the active exchanging device to the stand-by exchanging device. When the first monitoring circuit supplies the first monitoring signal to the main control circuit. Responsive to the first monitoring signal, the main control circuit delivers the change over operation signal to the first and the second control circuits 31 and 32.

What is claimed is:

1. A data exchange for use in an asynchronous transfer mode communication system for exchanging an input data block into an output data block, said data exchange comprising first buffer means for successively memorizing said input data block as a first buffered data block to a predetermined block number to produce said first buffered data block as a first output data block, second buffer means for successively memorizing said input data block as a second buffered data block to the predetermined block number to produce said second buffered data block as a second output data block, receiving means for receiving a received data block to selectively supply said received data block as said input data block to said first and said second buffer means, and transmitting means for carrying out transmission of one of said first and said second output data blocks as said output data block, wherein said data exchange further comprises:

control signal producing means for producing a first control signal for a normal operation, said control signal producing means producing a second control signal for a change over operation;

test data supplying means for supplying a test data block to said first and said second buffer means in response to said second control signal; and said receiving means being responsive to said first control signal to supply said received data block as said input data block to said first buffer means, said receiving means being responsive to said second control signal to supply said received data block as said input data block to said first and said second buffer means after production of said test data block;

said data exchange still further comprising:

detecting means for detecting whether or not said first output data block is coincident with said test data block to produce a first detecting signal, said detecting means for detecting whether or not said second output data block is coincident with said test data block to produce a second detecting signal;

monitoring means for monitoring said second buffer means to produce a monitoring signal when the number of said second buffered data blocks is equal to said predetermined block number; and control means responsive to said first and said second detecting signals for controlling said receiving means and said transmitting means to connect said receiving means and said transmitting means to said second buffer means, said control means being responsive to said monitoring signal independently of said first and second detecting signals, for controlling said receiving means and said transmitting means to connect said receiving means and said transmitting means to said second buffer means.

2. A data exchange as claimed in claim 1, said received data block comprising a data block format having a predetermined fixed length, said data block format comprising a header for arranging an address signal and a data area for arranging a data signal, said test data block comprising a test area for arranging a test identifier code which has a predetermined pattern, wherein said detecting means produces said first and said second detecting signals when said test identifier code is detected in said first and said second output data blocks, respectively.

3. A data exchange as claimed in claim 2, wherein a selected one of said first and said second buffer means is controlled so that either one of said first and said second output data blocks is not read out of the selected one of said first and said second buffer means after said test identifier code is detected in the either one of said first and said second output data blocks until said test identifier code is detected in a remaining one of said first and said second output data blocks that is read out of the remaining one of said first and said second buffer means.

* * * * *